United States Patent
Humphris et al.

(10) Patent No.: US 7,596,989 B2
(45) Date of Patent: Oct. 6, 2009

(54) PROBE FOR AN ATOMIC FORCE MICROSCOPE

(75) Inventors: Andrew David Laver Humphris, Bath (GB); Jamie Kayne Hobbs, Sheffield (GB); Mervyn John Miles, Kingsweston (GB)

(73) Assignee: Infinitesima Limited, Oxford (GB)

( * ) Notice: Subject to any disclaimer, the term of this patent is extended or adjusted under 35 U.S.C. 154(b) by 0 days.

(21) Appl. No.: 10/564,598

(22) PCT Filed: Jul. 15, 2004

(86) PCT No.: PCT/GB2004/003065

§ 371 (c)(1),
(2), (4) Date: May 18, 2006

(87) PCT Pub. No.: WO2005/008679

PCT Pub. Date: Jan. 27, 2005

(65) Prior Publication Data

US 2007/0024295 A1 Feb. 1, 2007

(30) Foreign Application Priority Data

Jul. 15, 2003 (GB) ................. 0316577.6
Oct. 3, 2003 (GB) ................. 0323229.5
Apr. 13, 2004 (GB) ................. 0408234.3

(51) Int. Cl.
*G01B 5/281* (2006.01)
(52) U.S. Cl. ....................................... 73/105
(58) Field of Classification Search .................. None
See application file for complete search history.

(56) References Cited

U.S. PATENT DOCUMENTS

| 5,515,719 | A | | 5/1996 | Lindsay |
| 5,670,712 | A | | 9/1997 | Cleveland et al. |
| 5,983,712 | A | * | 11/1999 | Lindsay et al. ................. 73/105 |
| 6,118,124 | A | | 9/2000 | Thundat et al. |
| 6,185,991 | B1 | * | 2/2001 | Hong et al. .................... 73/105 |

(Continued)

FOREIGN PATENT DOCUMENTS

DE 44 35 635 A1 6/1996

(Continued)

OTHER PUBLICATIONS

Nobuhiro Kato, et al, "Reduction in Feedback Bandwidth of the Force Controlled Atomic Force Microscope Using a Polyimide Cantilever," Jpn. J. App.Phys., vol. 40 (2001) pp. 6599.

(Continued)

*Primary Examiner*—Robert R Raevis
(74) *Attorney, Agent, or Firm*—Volpe and Koenig, P.C.

(57) ABSTRACT

A probe for an atomic force microscope is adapted such that, as a sample is scanned, it experiences a biasing force urging the probe towards the sample. This improves probe tracking of the sample surface and faster scans are possible. This is achieved by either including a biasing element, which is responsive to an externally applied force, on the probe and/or reducing the quality factor of a supporting beam. This biasing element may, for example, be a magnet or an electrically-conducting element. The quality factor may be reduced by coating the beam with a mechanical-energy dissipating material.

37 Claims, 11 Drawing Sheets

U.S. PATENT DOCUMENTS

| | | | |
|---|---|---|---|
| 6,245,204 | B1 | 6/2001 | Jing et al. |
| 6,330,824 | B1 | 12/2001 | Erie et al. |
| 6,349,591 | B1 | 2/2002 | Brocart et al. |
| 6,886,395 | B2 * | 5/2005 | Minne .................. 73/105 |
| 2002/0179833 | A1 * | 12/2002 | Shirakawabe et al. ....... 250/306 |
| 2004/0051542 | A1 | 3/2004 | Miles et al. |
| 2005/0029450 | A1 * | 2/2005 | Hough et al. ............... 250/306 |

FOREIGN PATENT DOCUMENTS

| | | |
|---|---|---|
| EP | 0557743 A | 1/1993 |
| EP | 0 872 707 B1 | 4/1998 |
| JP | 09119939 A | 5/1997 |
| WO | WO 99/06793 | 2/1999 |
| WO | WO02/063368 A1 | 8/2002 |
| WO | WO 2005/008679 A1 | 1/2005 |

OTHER PUBLICATIONS

S.P. Jarvis, et al., "A New Force Controlled Atomic Force Microscope for Use in Ultrahigh Vacuum," Rev. Sci. Instrum. 67(6), Jun. 1996, American Institute of Physics.

Xiaobo Yin, et al, "Near-field Two-Photon Nanolithography Using an Aperturelesss Optical Probe," App. Phy. Letters, vol. 81, No. 19, Nov. 2002.

* cited by examiner

US 7,596,989 B2

PROBE FOR AN ATOMIC FORCE MICROSCOPE

This application is a U.S. national phase application of PCT/GB2004/003065, filed Jul. 15, 2004, which claims the benefit of United Kingdom Application Nos. GB 0316577, filed Jul. 15, 2003, GB 0323229, filed Oct. 3, 2003, and GB 0408234, filed Apr. 13, 2004, the entire contents of which are incorporated herein by reference.

This invention relates to the field of atomic force microscopes, to the probes employed in such microscopes and to a method of operating such microscopes. In particular, it relates to an atomic force microscope that does not employ conventional feedback control of probe height.

The atomic force microscope (AFM), or scanning force microscope (SFM), was invented in 1986 by Binnig, Quate and Gerber. Like all other scanning probe microscopes, the AFM is based on the principle of mechanically scanning a nanometric probe over a sample surface in order to acquire an "interaction map" of the sample. The interaction force in this case is simply the molecular interaction between the sample and the tip of a sharp probe attached to a cantilever spring. When the probe tip is brought into close proximity with the sample, the cantilever bends in response to the interaction force. Images are collected by scanning the sample relative to the probe and measuring the deflection of the cantilever as a function of lateral position. An optical lever technique is usually used to measure this bending. Since the cantilever obeys Hooke's Law for small displacements, the interaction force between the tip and the sample can be deduced.

The AFM is usually operated in one of two modes. In constant force mode, feedback enables a positioning piezoelectric driver to move the sample (or probe) up or down in response to any change in the interaction force that is detected. In this way, the interaction force may be held relatively steady and a fairly faithful topographical image of the sample is obtained. Alternatively the AFM may be operated in constant height mode. No, or very little, adjustment of the vertical height of the sample or probe is imparted during the scan. In this context, adjustment of the vertical height means that a translation is applied either to an actuator connected to the cantilevered probe or to the sample itself. There remains therefore a degree of freedom for the probe Up to move up and down as the degree of cantilever bend is varied. In constant height mode, topographical changes to the sample are indistinguishable from interaction force variations in that either or both will cause the cantilever spring to bend.

In addition to these differing feedback regimes, image contrast is usually obtained in one of three different ways. In contact mode the tip and sample remain in close contact, i.e. in the repulsive regime of the molecular Interaction, as scanning proceeds. In tapping mode an actuator drives the cantilever in a "tapping" motion at its resonant frequency. The probe tip therefore only contacts the surface for a very small fraction of its oscillation (tapping) period. This dramatically shortened contact time means that lateral forces on the sample are very much reduced and the probe is therefore less destructive to the specimen as the scan is taken. It is consequently much used for imaging sensitive biological specimens. Oscillation amplitude is generally held constant using a feedback mechanism. In non-contact operation the cantilever is oscillated above the sample at such a distance that the molecular interaction force is no longer repulsive. This mode of operation is however very difficult to implement in practice.

Recent advances in probe microscopy have led to much faster data collection times. With faster scan techniques, such as that described in PCT patent application publication number WO 02/063368, finite probe responsivity is increasingly becoming a limiting factor in image collection times. The probe will not respond instantaneously to a change in sample characteristics and so there is an inherent time delay between, for example, the probe encountering a region of the sample surface with increased height and the system reacting to it. This disadvantage applies to both constant force and constant height modes of AFM operation. It is less severe in constant height mode, which is therefore the preferred mode of operation for fast scanning techniques, but it is still sufficient to limit unduly the scan speed of the current generation of fast scanning probe microscopes.

In constant force AFM mode, an electronic feedback mechanism is usually employed in order to keep the average interaction force constant. As the scan progresses if there is a change in interaction force (for example caused by a change in sample height) this is first observed by change in probe response which is detected by the detection electronics, an error is generated (e.g. set point minus deflection) and a feedback loop is used to minimise the error signal by adjusting the probe or sample position. The feedback loop has a time constant associated with it which imposes a limitation on the ultimate speed with which a full image scan can be collected.

The problem is not so restrictive if operating in constant height mode, in which electronic feedback is not normally employed to the extent that it is used in constant force AFM. For the interaction force to be measured accurately however the probe tip should, as far as possible, track the contours of the sample surface. This is ensured by exploiting the reaction force developed as the cantilever is bent by the sample surface. That is, as a high region of the sample surface is scanned, the cantilever is increasingly bent upwards and the energy stored in the spring is increased. As the height falls away, a restoring force pushes the cantilever back towards its equilibrium (straight) position, thus maintaining contact with the surface. If however the scan speed is too fast, the probe will not track the surface but will effectively be thrown upwards over any protuberance from the surface and may start to resonate, or "ring". This in turn gives rise to oscillations in the imaged interaction force. Similarly, when the height falls away the restoring force might not be sufficiently large to ensure that the probe tip remains in contact with the surface and information about the surface in that region of the image will be lost.

WO 02/063368, referred to above, describes a scanning probe microscope In which either the sample or the probe is mounted on a resonator and, by driving the resonator at or close to its resonant frequency, the sample can be scanned relative to the probe. The resonator will typically have a resonant frequency of several 10 s of kHz, which is similar to the resonant frequency of the probe. The typical time spacing between pixels is therefore shorter than $1/f_r$, where $f_r$ is the resonant frequency of the probe. On the other hand the time taken ($\tau_{res}$) to respond to a change in topography of the sample surface is based on the effective mass of the probe and the spring constant of the cantilever. If $\tau_{res} > 1/f_r$, then clearly the interaction force will not be measured accurately from pixel to pixel.

There is a perceived need to provide for improved probe responsivity to sample topographic fluctuations or to variations in the interaction force and so to permit AFM microscopy to be performed at faster scanning speeds before image artefacts such as those caused by probe ringing or poor tracking of the surface start to degrade image quality.

The present invention provides a probe for use in an atomic force microscope or for nanolithography, the probe comprising a force sensing member connected to a probe tip having a tip radius of 100 nm or less characterised in that the probe is adapted such that, when subject to an externally applied force, a biasing force urges either or both of the probe tip and a sample towards each other with magnitude greater than a restoring force arising from a displacement of the probe tip as it probes the sample.

In appreciating the scope of this invention it is helpful to consider the forces Involved as a typical cantilevered probe makes contact with a sample surface in a prior art atomic force microscope. This will therefore now be explained with reference to FIG. 1.

In FIG. 1, there is shown a sample 1 that is being scanned by a probe of an atomic force microscope (AFM). The probe comprises a substrate 2 from which a cantilever 3 extends, the cantilever 3 having a sharp probing nanometric tip 4 having a tip radius of 100 nm or less, mounted at an end remote from the substrate 2. In preparation for a scan, a downwards force ($F_{external}$) is applied to the probe at its substrate end 2 via its mounting to the AFM, moving the probe tip 4 into contact with the sample 1. In order to maintain contact for the duration of a scan, the force $F_{external}$ 1 is greater than that required simply to bring the tip 4 into contact with the sample 1. As a result the cantilever 3 is bent upwards from its rest position 5 as the sample is scanned.

In a simplified model, the cantilever 3 can be taken to obey Hooke's Law for small displacements. Accordingly if, when pressing on the sample, the degree of bending is such as to move the tip 4 a perpendicular distance x from its rest position and the cantilever spring constant is k then the restoring force exerted by the cantilever is kx. The downward force exerted by the tip 4, holding it in position tracking the surface, is thus proportional to kx.

Clearly the responsivity of the probe tip 4 and hence the resolution of the AFM technique depends on the degree of force kx exerted by the cantilever 3 on the sample 1. The greater the force between probe and surface, the greater the responsivity to surface variations. This indicates that a high spring constant k is desirable, particularly if the scan is to be fast. On the other hand, the greater the force, the more likely the probe is to damage the sample. Accordingly prior art AFM cantilever probes must make a fundamental compromise between probe responsivity and the likelihood of damaging the sample.

A probe in accordance with the present invention however is adapted such that, as a sample is scanned, it experiences a biasing force that is significantly larger than the restoring force kx exerted by the probe on the sample. This enables it to better track the sample surface and faster scans are possible. As will be seen in more detail later, exceeding the restoring force with the biasing force, as required by this invention, is achieved by either including a biasing element, which is responsive to an externally applied force, on the probe and/or reducing the spring constant of the cantilever beam.

With the present invention, unlike conventional AFM where image collection may take upwards of 30 seconds, millisecond imaging of samples is possible. For example, tip velocities of 22.4 cms$^{-1}$ enables an area of 4.4×4.4 microns to be imaged in 14.3 ms and an area of 1.5×1.5 microns in 8.3 ms with 128 by 128 pixels. Moreover, even at this speed Images with better than 10 nm lateral and 1 nm vertical resolution are achievable with a soft polymer surface.

In one embodiment of this invention the biasing element may, for example, be a magnetic element that is responsive to an externally applied magnetic force or an electrically-conductive element that is to be connected to one terminal of a power supply and so enable a voltage potential to be developed between probe and sample. In both cases the polarity of the biasing force (magnetic or electrostatic) is such that it urges the probe and sample towards each other. Furthermore, the magnitude of the biasing force that is applied to the probe is independent of the degree of its deflection. In this way, since the probe beam has a very low spring constant, the bending/deflection restoring force is very small compared to the biasing force and so the force of the tip on the surface is effectively deflection-independent.

Prior art AFM probes have been specifically fabricated so as to be responsive to an external biasing force. EP 872 707, for example, describes a cantilever probe that includes a piezoelectric element. A control signal is sent to the piezoelectric element in order to urge the probe upwards, away from the sample, in order to overcome attractive forces. Similarly U.S. Pat. No. 5,515,719 describes a probe that includes a magnetic particle, which, in response to a solenoid-controlled magnetic field, causes the probe to be pulled away from the sample surface. As before, the focus of this patent is to prevent the probe from being attracted to the sample surface and causing damage.

The cantilever probe disclosed in patent application publication number WO 99/06793 also incorporates a magnetic element. The magnetic field in this arrangement however is used to control the probe—sample distance, and varies in accordance with the desired separation. This is to be contrasted with the magnetic field arrangement used for the present Invention. In the course of a scan, the force supplied to the tip in this Instance is constant, it is solely for the purpose of accelerating the tip back towards the sample surface, should contact be lost. Another system that Incorporates a probe that is responsive to an adjustable magnetic field is described in U.S. Pat. No. 5,670,712. The field magnitude is controlled by a feedback loop set to maintain the deflection of the cantilever at a constant level. Again this is to be contrasted to an AFM probe in accordance with the present invention in which it is essential to allow the degree of deflection to vary. Without this freedom of movement, the contours of the sample surface could not be tracked and interaction force measured, which runs counter to the whole purpose of this invention.

In an alternative approach, the cantilever beam is designed to have a low quality (or Q) factor. This, in comparison with high Q factor beams, increases the rate at which mechanical energy is dissipated. If a probe located on such a beam is knocked away from the surface during a scan, any consequential mechanical oscillations are reduced and the probe will return quickly to track the sample surface. In one embodiment, the Q factor of the cantilever beam is reduced by applying a coating to the beam, the coating being adapted to dissipate energy that would otherwise be mechanically stored in the beam through excitation of one or more oscillatory modes. The Q factor of the supporting beam is therefore lowered for one or more of its vibrating modes in comparison to the Q factor of an equivalent uncoated beam. The coating is preferably of an energy-absorbing material, such as a polymer film, applied to at least one side of the probe.

Clearly sample tracking by the probe of this invention is best achieved if it is adapted both to be subject to an external direct force and to have a low Q factor. In certain circumstances however, only one of these features is necessary. As the probe is brought into the vicinity of a sample, a capillary neck is believed to form that connects the two. In particular, if the Q factor of the probe is sufficiently low, it has been found that the biasing force that arises from the capillary neck forms the dominant restoring force. Similarly, If a stronger biasing force is applied, the Q factor of the beam need not be so low.

It is thought that, in this instance, dissipation of mechanical energy may also occur via the probe's interaction with the sample surface.

AFM cantilevers with coatings are disclosed in the prior art, although none are coated with a material that is suitable for damping of mechanical oscillations. U.S. Pat. No. 5,515, 719, referenced above discloses a magnetic coating by which a force may be applied to a cantilever. U.S. Pat. Nos. 6,118, 124 and 6,330,824 both describe coated cantilevers for the detection of radiation. The coating is therefore affected by the radiation, radiation intensity being measured by a quantitative change in the properties of the cantilever. This is to be contrasted with the coating material of the present invention, which is not affected by incident radiation, but absorbs mechanical energy.

In an alternative aspect the present invention provides an atomic force microscope for imaging a sample in accordance with an interaction force between the sample and a probe, the microscope comprising driving means arranged to provide relative scanning motion between the probe and the sample surface and capable of bringing the sample and probe into close proximity, sufficient for a detectable interaction to be established between them; and a probe detection mechanism arranged to measure deflection and/or displacement of the probe;

characterised in that, the microscope includes the probe as described above.

Alternatively, the microscope is characterised in that, it includes force ($F_{direct}$) generating means arranged such that, in operation, a force ($F_{direct}$) is applied to either or both of the sample and the probe or between the sample and the probe, the force ($F_{direct}$) being directed so as to urge the probe towards the sample or vice versa.

In a further aspect the present invention provides a method of collecting Image data from a scan area of a sample with nanometric features wherein the method comprises the steps of:

(a) moving a probe having a supporting beam with a tip having a tip radius of 100 nm or less into close proximity with a sample in order to allow an interaction force to be established between probe and sample;

(b) causing a force ($F_{direct}$) to be established between sample and probe such that the probe is urged to move towards the sample or vice versa;

(c) scanning either the probe across the surface of the sample or the sample beneath the probe whilst providing a relative motion between the probe and surface such that an arrangement of scan lines covers the scan area;

(d) measuring deflection and/or displacement of the probe; and (e) processing measurements taken at step (d) in order to extract information relating to the nanometric structure of the sample.

Embodiments of the invention will now be described by way of example only and with reference to the accompanying drawings.

Figure 2:
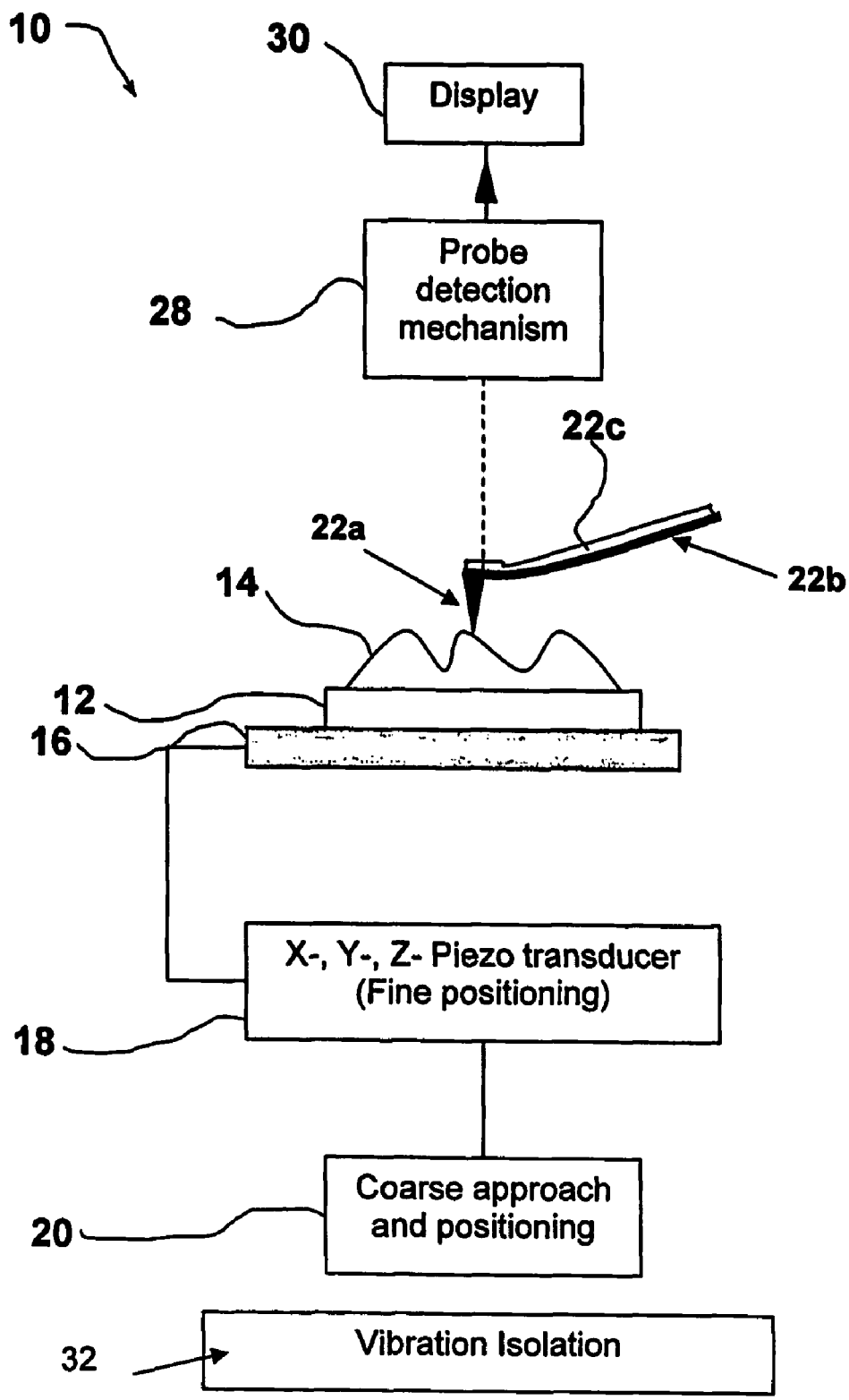
FIG. 2 shows a schematic implementation of an atomic force microscope that includes a probe, which is in accordance with a first embodiment of the present invention.

With reference to FIG. 2 there is shown a schematic implementation of an AFM, indicated generally by 10, that utilises a first embodiment of a probe constructed in accordance with an aspect of the present invention. The AFM apparatus 10 shown comprises a plate 12 adapted to receive a sample 14, and which is mounted on one prong of a tuning fork 16. The tuning fork 16 is connected to a piezoelectric transducer 18 and a coarse driving means 20. The piezoelectric transducer 18 is used to drive the sample 14 (together with the plate 12 and fork 16) in three dimensions: x, y and z directions. As is conventional in the field, the z axis of a Cartesian coordinate system will be taken to be that perpendicular to a plane occupied by the sample 14. That is, the interaction force is dependent both on the xy position of a probe 22 over the sample 14 (the pixel it is imaging), and also on its height above it. A tuning fork control (not shown) is arranged to apply a sinusoidal voltage to the tuning fork 16 and so to excite a resonant or near-resonant vibration within the xy plane. Optionally, the plate 12 and tuning fork 16 may be supported on a vibration isolating mount 32 so as to isolate the vibration of the tuning fork 16 from the remainder of the microscope. However, at the image frequencies contemplated with a microscope employing this probe, external noise is less of a problem than for lower image frequencies and so the vibration isolating mount may be dispensed with. The probe 22 is a low-mass AFM probe and, during a scan, an interaction force is developed between the probe tip 22a and the sample surface. A probe detection mechanism 28 is arranged to measure the displacement of the probe tip 22a or the bending of the beam 22b supporting the tip, which is indicative of interaction force strength. Data collected by the probe detection mechanism 28 is analysed and output to a display 30.

In general, prior art cantilever probes are fabricated from silicon or silicon nitride, which allows them to be produced readily using mature silicon microfabrication technology. Unlike prior art cantilever probes however, the probe 22 according to this invention has a polymer coating 22c applied to the supporting beam 22b of the probe. This coating 22c, as will be explained in more detail later, serves to dissipate energy that would otherwise be mechanically stored in the probe through the excitation of oscillatory modes and thereby lowers the Q factor of the supporting beam for one or more of its vibrating modes in comparison to the same beam without the presence of the coating 22c.

In taking images using the apparatus 10, the sample 14 is first brought into contact with the probe 22 using the coarse driving means 20. Fine height and initial start position adjustments are made with the piezo driver 18 whilst the probe detection mechanism 28 measures the bending of the probe as a result of the probe 22—sample 14 interaction force. Once the measured bending reaches a desired level, the sample surface is scanned beneath the probe 22. In scanning the sample 14 under the probe 22, the tuning fork 16 is set to vibrate into and out of the plane of the Figure (y axis). This oscillates the stage on which the sample is mounted. At the same time, the piezo 18 translates the sample 14 in a perpendicular (x) direction. Sample oscillation is with a relatively large amplitude, of the order of a few microns. During the course of a scan, readings are continually taken by the probe detection mechanism 28, which, as is standard in the art, may be based on an optical lever technique: probe bend is measured using laser light reflected from the probe. The output signal from the probe detection mechanism 28 is fed directly to a processor and display 30.

As stated above, the probe 22 shown in FIG. 2 differs from those of the prior art in that it is coated with a polymer material 22c. The coating 22c may be on one or both sides provided that the material itself is suitable for dissipating energy that would otherwise be stored in the probe.

The Q factor is a dimensionless quantity, which may be used to quantify the dissipation (or damping) of an oscillator. It has the property that:

$$Q = \frac{\text{Energy stored in oscillator}}{\text{Energy dissipated per radian}}$$

A heavily damped system, in which stored energy is dissipated rapidly, has a low Q, and a lightly damped system has high Q. Oscillators made from Si and SiN materials do not have much internal loss and, as a result, most commercially available AFM cantilevers will have high Q, typically of the order 5-500 in air. Moreover, if designed for use in tapping mode, it is advantageous for a cantilever to have a high 0. In this mode, the cantilever is driven at resonance and the interaction force measured over many cycles of oscillation. By minimising energy loss over the oscillation cycles, the high Q therefore acts as a mechanical filter.

A mechanical oscillator has many resonant modes of oscillation and the quality factor of each of these modes can be different, depending on the frequency dependent material properties and the shape of the oscillator. When referring herein to the Q factor we are referring to the Q factor of the probe with respect to any one of these modes, or to the Q factors of a set of modes In the case of the present invention however, it is desirable to use a probe with low Q in high-speed atomic force microscopy. If the probe has a high Q, it will take a long time to respond to changes and it will ring at a combination of resonant modes if given a stimulus, such as provided by scanning across a high feature on the sample surface. The present probe is designed to have a low Q by virtue of its coating 22c. The Q factor is, Ideally, sufficiently low such that any induced oscillation is critically damped. The use of a low quality factor means that little energy can be stored in the supporting beam of the probe and so the probe will not "ring" for long if shocked, such as when scanning over a high region of the sample surface. This enables a speedier return to the sample surface, and consequently its better tracking during a scan.

The coating on the probe acts to dissipate mechanical energy that would otherwise be stored in the probe. The probe with the coating will store less mechanical energy than the probe without the coating, and the motion of the probe with the coating at a specific time will relate more closely to the surface under the probe tip at that specific time, than it would do if the coating was not present.

Depending on the sample being imaged and the scan-speed chosen, it may be that a higher mode than the first or fundamental mode is most likely to be excited during imaging. In this case the coating is chosen to ensure that the Q factor of this mode is significantly reduced. By tuning the energy absorbing and dissipating properties of the coating it is possible to reduce or remove oscillations of the probe that are most likely to interfere with Image quality while minimising the change in mass of the probe.

Many polymer materials may be used to provide the coating 22c, and the opportunities for specific selection will be apparent to one skilled in the art. The material is selected for its viscous-elastic properties: it must be sufficiently elastic to maintain its shape as a film coating the cantilever, whilst performing its task of dissipating mechanical energy. Dissipation of mechanical energy occurs primarily through viscous mechanisms that depend, on a molecular scale, on the frictional coefficient between a polymer chain and its surroundings. The ideal coating is a rubber with low cross-link density, the degree of which is just sufficient to maintain the coherence of the coating. Cross-links can either be chemical, as in a conventional rubber, or physical, as in a thermoplastic elastomer. A block copolymer material in which the majority component is an amorphous rubber, with glass transition temperature below room temperature, and the minority component is an amorphous polymer with a glass transition temperature above room temperature, coated on both sides of an AFM supporting beam has been found to improve markedly its tracking capability when used at room temperature. The copolymer was applied by solution casting. That is, a drop of solution containing the polymer is placed on the supporting beam at high temperature in order to drive off the solvent. Other thermoplastic elastomers may also be used. Such an arrangement has been found to permit the probe to track a sample surface even at resonant oscillation speeds such as described in WO 02/063368.

Considerations as to the polymer material and application method adopted narrow the available choice to some extent. The basic idea is to coat the supporting beam with an energy-absorbing material that, ideally, does not unduly affect other properties of the probe such as mass, sharpness of tip, etc. Solution casting the supporting beam with the above-described copolymer has been found to enhance energy dissipation with an acceptable increase in mass. Other coating methods can be used however. These include: "dragging" a charged polymer onto the supporting beam in an electrolysis cell; chemically tagging the polymer (for Instance with a thiol group) and using its reaction with the material of the supporting beam, or metal coating on the supporting beam (e.g. gold in the case of thiol chemistry), to attach the polymer to the supporting beam.

As noted previously, polymer coatings on AFM cantilevers are known. Such prior art coating materials are however selected for their chemistry, in order to permit detection of incident radiation. That is, the material must have chemical bonds that absorb energy preferentially at particular frequencies. Such materials will not be suitable for dissipation of mechanical energy with an efficiency suitable for use in a high-speed microscope.

Applying a coating 22c to both sides of the supporting beam, given its small size, is, practically, somewhat easier to achieve than coating one side only. It is however preferred that the side of the supporting beam nearer to the sample is left uncoated. The single-sided coating is sufficient to reduce the mechanical energy stored in the probe and also reduces the likelihood of any coating material contaminating the sample when the probe makes contact.

Ideally the polymer material used for the coating 22c will have a peak in its energy loss spectrum at the temperature of the probe's anticipated use and In the frequency range of the principal resonant modes of the supporting beam. Typically, it should therefore be a rubbery polymer. Alternatively a copolymer or other composite with a high component of rubbery polymer may also be used.

The energy dissipation of a polymer coating may be increased if it is applied to span gaps in the cantilever. That is, if a thin polymer film bridges a hole in the cantilever, the film will act both to dissipate energy internally and to increase the interaction area with a surrounding fluid medium, e.g. air. Viscous energy dissipation is thus increased through this route, while at the same time minimising the spring constant of the cantilever.

Figure 3:
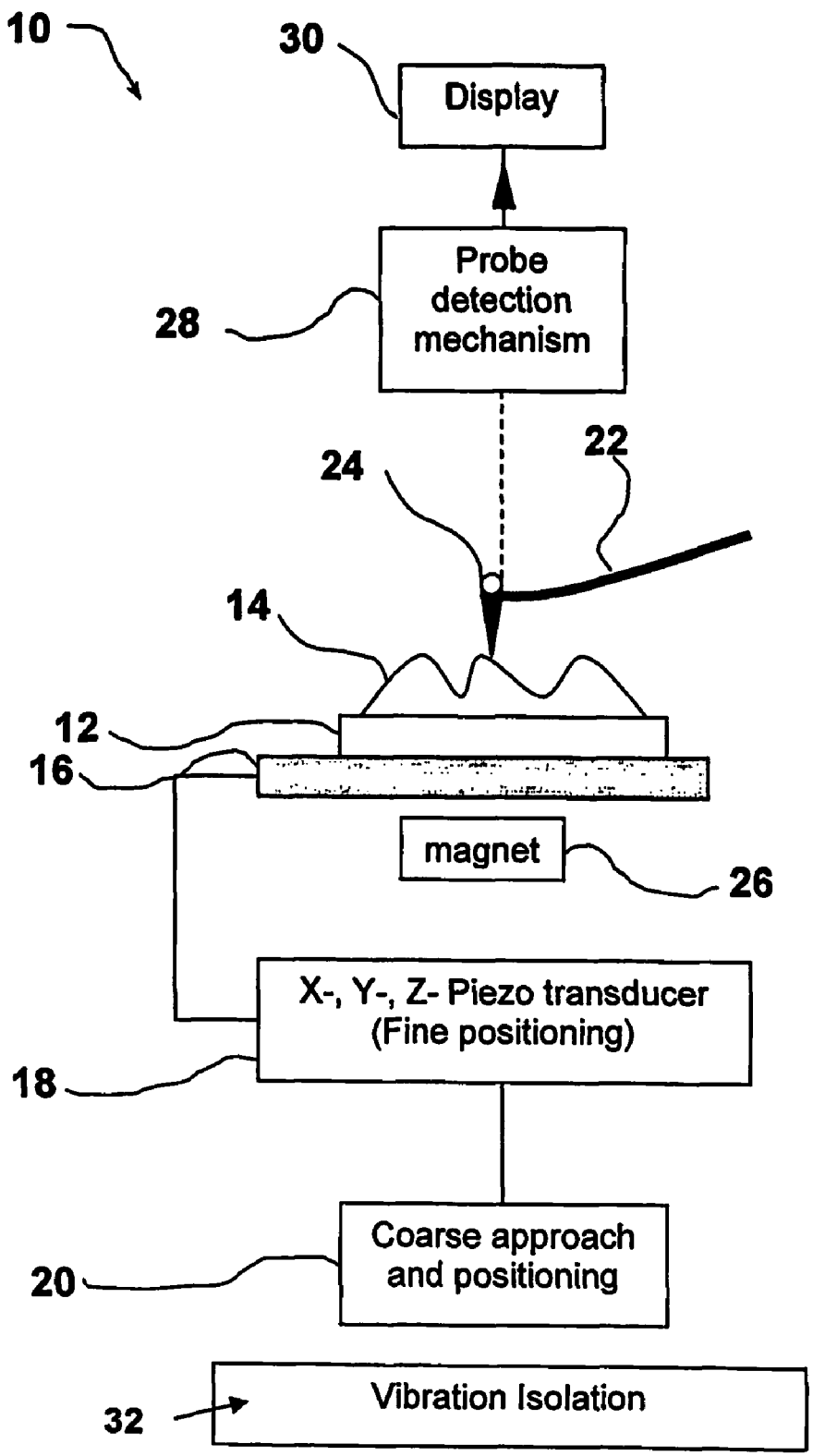
FIG. 3 shows a schematic implementation of an atomic force microscope that includes a probe, which is in accordance with a second embodiment of the present invention.

FIG. 3 shows a schematic implementation of an AFM, indicated generally by 10, that utilises a second embodiment of a probe constructed in accordance with the present invention. The AFM apparatus 10 is very similar to that shown in FIG. 2, and components common to both systems are similarly referenced. As before, the plate 12 holding the sample 14 is mounted on one prong of the tuning fork 16, which is driven with a resonant or near-resonant vibration within the xy plane. The sample 14 (together with the plate 12 and fork 16) is scanned in three dimensions: x, y and z directions, with the interaction force developed being dependent both on the xy position of the probe 22 over the sample 14 (the pixel it is imaging), and also on its height above it. The cantilever component of the probe 22 is coated on both sides with a polymeric film and is shaped so as to have a low spring constant, less than 1 Nm$^{-1}$. Unlike the cantilever shown in FIG. 2 however, the probe 22 according to this embodiment of the invention additionally has a magnetic element 24 (a bead is illustrated in FIG. 3) mounted above the tip 22a. Also a magnet 26 is incorporated within the AFM, for example below the plate 12, to provide a magnetic field of sufficient strength to exert a force on the magnetic bead 24. The force may be via a magnetic torque applied to the probe or through a magnetic gradient. The probe detection mechanism 28 is arranged to measure the bending of the probe 22, as for the apparatus 10 shown in FIG. 2. Data collected by the probe detection mechanism 28 is analysed and output to a display 30.

In taking images using the apparatus 10, the contact mechanism to establish an interaction force and scanning technique are substantially as described in relation to the apparatus 10 of FIG. 2. Once the desired level of interaction force, and hence bend of the supporting beam 22b of the probe, is established however, then the magnet 26, which is not present in the FIG. 2 apparatus 10, is switched on and a magnetic field B is generated in the vicinity of the probe tip 22a. The magnetic bead 24 Interacts with this field, which is directed such that the resultant magnetic force attracts the magnetic bead 24 downwards towards the sample 14. The probe tip 22a is therefore held in contact with the sample 14 by the direct action of this magnetic force. With the magnetic field B on, the sample surface is oscillated (at the resonant frequency of the tuning fork-sample stage) and scanned beneath the probe 22 and the output signal processed as before.

Figure 5:
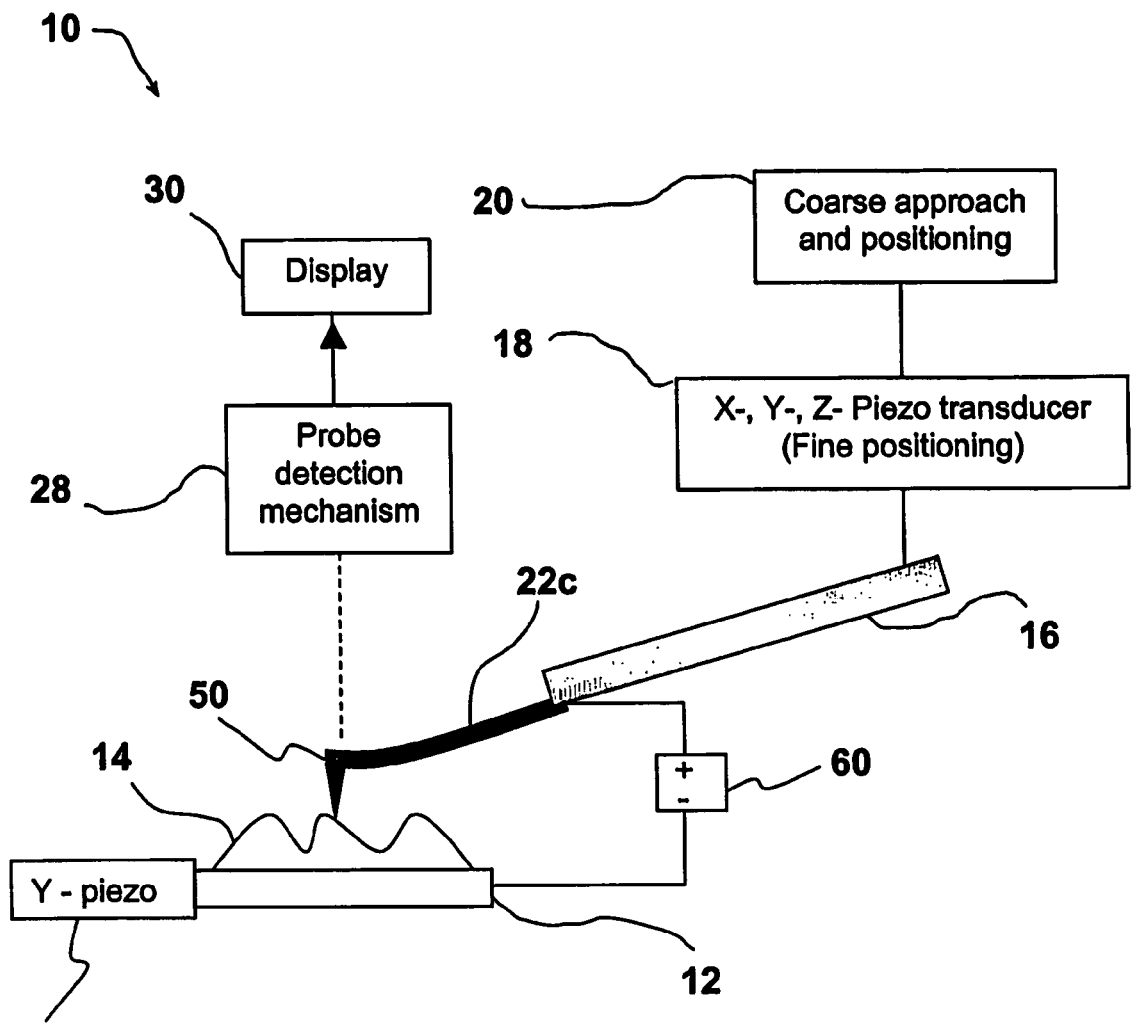
FIG. 5 shows a schematic implementation of an atomic force microscope that includes a probe, which is in accordance with a fourth embodiment of the present invention.
Figure 6:
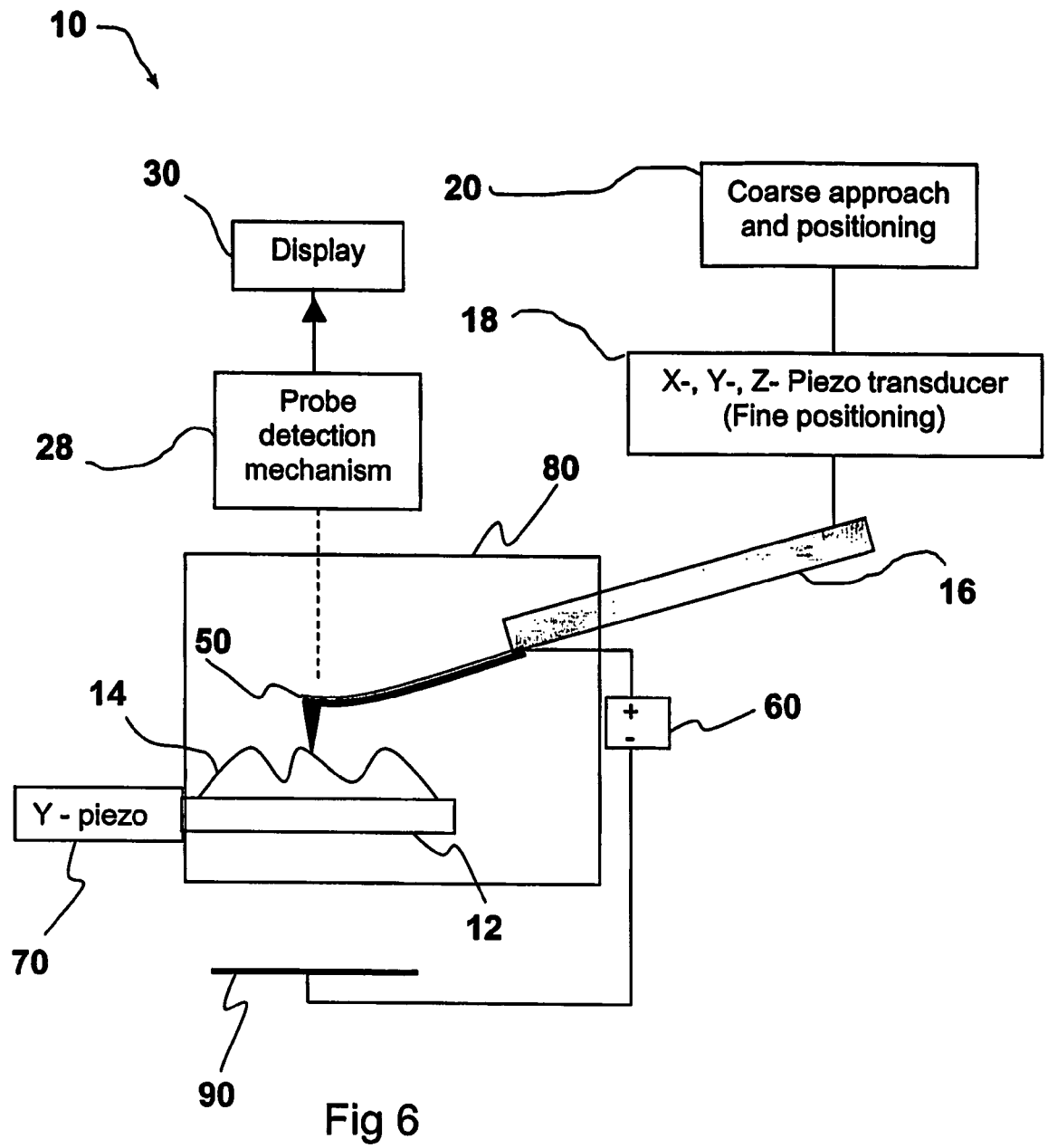
FIG. 6 shows a schematic implementation of an atomic force microscope that includes a probe, which is in accordance with a fifth embodiment of the present invention.
Figure 7:
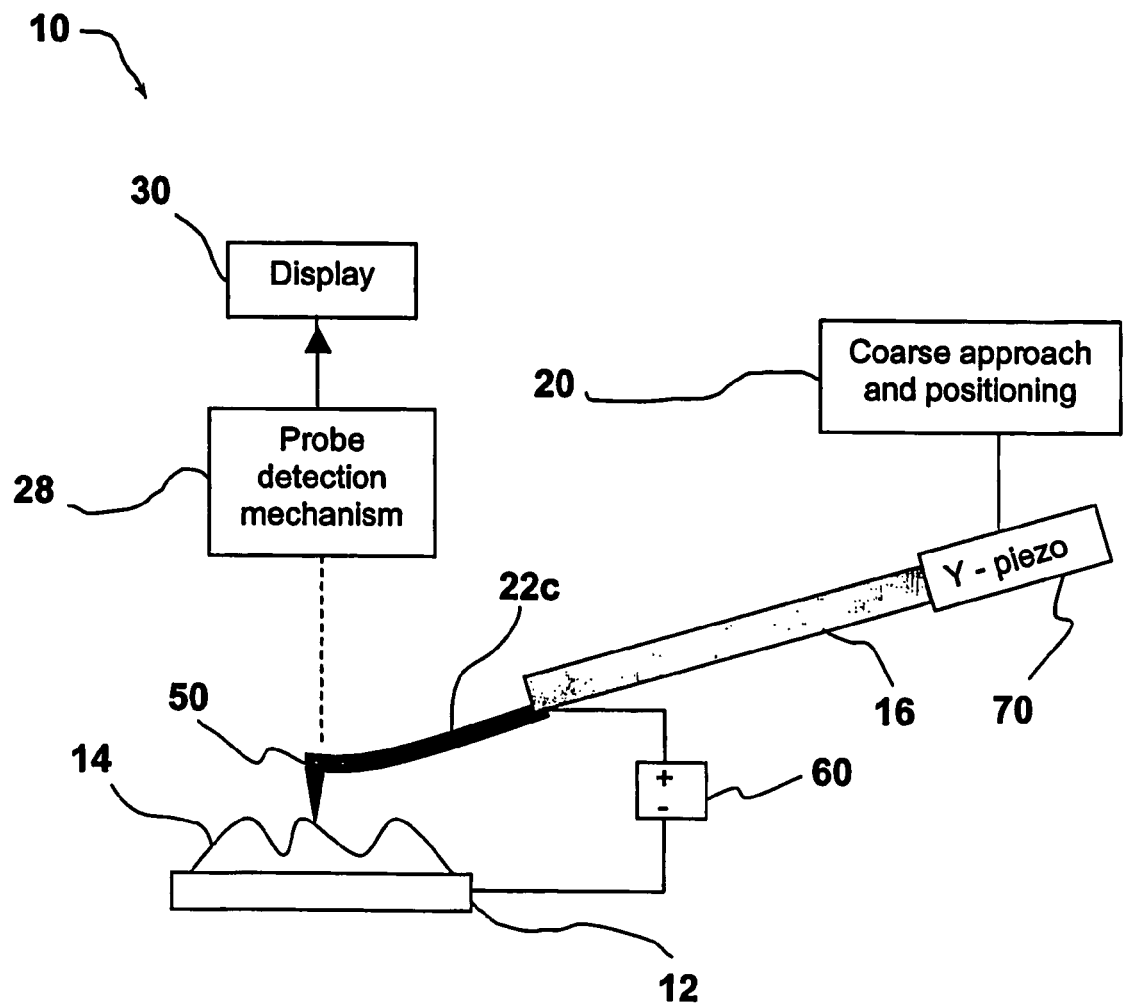
FIG. 7 shows a schematic implementation of an atomic force microscope that includes a probe, which is in accordance with a sixth embodiment of the present invention.

FIGS. 4 through 7 show schematic implementations of alternative AFMs, Indicated generally by 10, that utilise further embodiments of a probe constructed in accordance with the present invention. In each case the AFM apparatus 10 is very similar to that shown in FIGS. 2 and 3, and components common to all apparatus are similarly referenced. As before, the sample 14 is mounted on a plate 12. Different from the embodiments illustrated in FIGS. 2 and 3, in FIGS. 4, 5, 6 and 7 the probe 22 is mounted on one prong of the tuning fork 16 and control of the approach and both coarse and fine positioning of the probe relative to the sample is controlled by transducers 18, 20, such as piezo transducers, which control movement of the probe 22 and tuning fork 16 rather than the plate 12. This arrangement allows the probe to be scanned using the resonant scanning method above the sample, rather than the sample being scanned below the stationary probe. With respect to FIG. 4 the resonator 16 and probe 22 are scanned in the x-axis using the x-y-z piezo transducer 18 while in FIGS. 5 and 6 control of relative probe/sample movement in the scan direction (x direction) during a scan is provided by means of a transducer 70 connected to the plate 12. Thus the sample can either be scanned in both axes while the probe is stationary, or the probe can be scanned in both axes while the sample is stationary, or one or other of the probe or sample can be scanned in one axis, while scanning in the other axis is provided by motion of the other. In the case of FIG. 7 control of the relative probe/sample scan movement is provided by a transducer 70 connected to the resonator 16 and probe 22 and fine positional control is omitted as such precision of the starting scan position is not in all cases required. This highlights an additional advantage of the very fast scan rates that are obtainable using the described invention in conjunction with the resonating scanning method. The image rate is higher than common frequencies for mechanical noise, and higher than the instabilities in motion that are commonly present in course positioning methods. Thus it is possible to dispense with the high precision piezoelectric transducers that are usually required.

Figure 4:
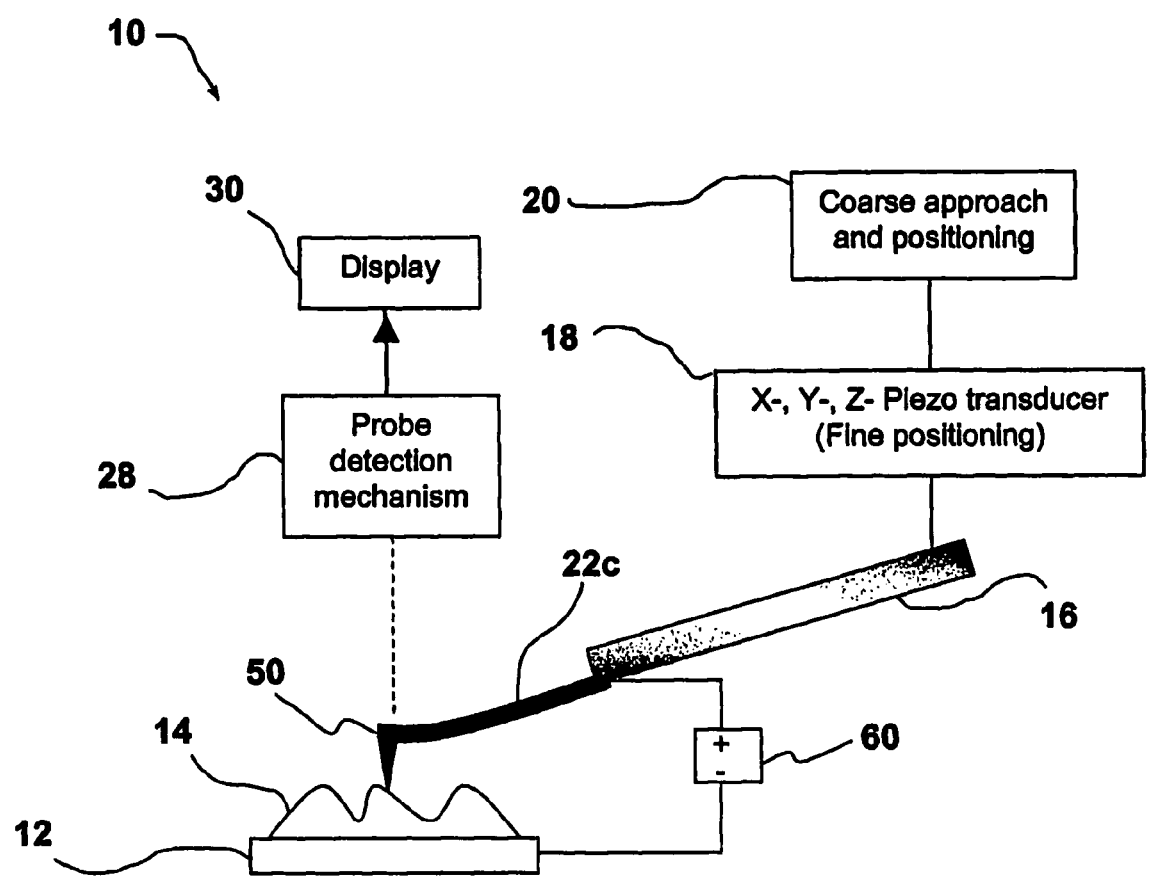
FIG. 4 shows a schematic implementation of an atomic force microscope that includes a probe, which is in accordance with a third embodiment of the present invention.

In FIGS. 4, 5 and 7 the probe tip 22a is subjected to a force urging the tip 22a towards the sample 14. In the example of FIG. 4 the force is attractive and arises from a biasing voltage being applied between the probe tip 22a and the plate 12. Hence, the probe tip 22a and the plate 12 are connected in series across the terminals of a power supply 60. In order to establish the necessary attractive force between the probe tip 22a and the plate 12, the probe is provided with an electrically conductive coating 50 in addition to the damping coating 22c to ensure the probe has a low Q factor. In the case of FIG. 6 the sample 14 and probe tip 22a are positioned within a sealed viscous environment 80, such as a liquid environment. In this embodiment the power supply 60 is connected across the conductive coating 50 and a second plate 90 located beneath the sample plate 12 outside of the viscous environment. By immersing the probe in a liquid (which in the case of biological samples may be desirable) the damping coating 22c may be omitted from the probe as the exposure of the probe to the liquid environment results in the probe having a low Q factor approximating 1.

Figure 1:
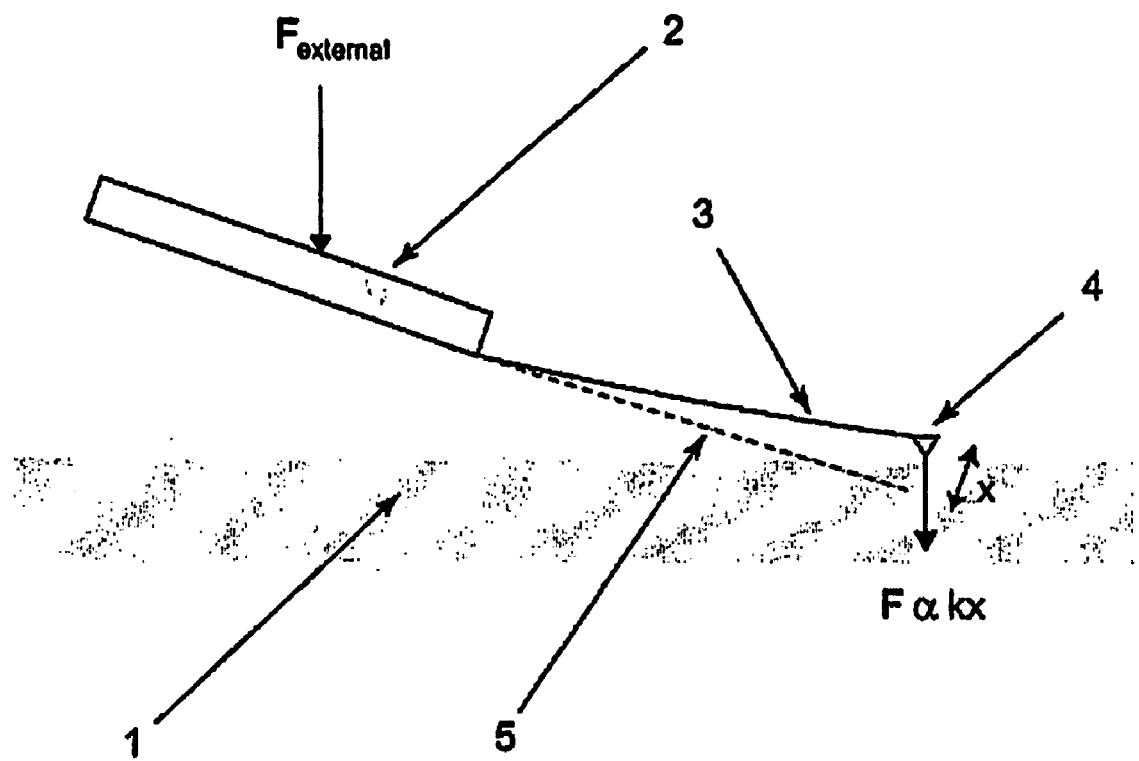
FIG. 1 is a diagrammatic illustration of the forces involved as a cantilevered probe makes contact with a sample surface in a prior art atomic force microscope.
Figure 8:
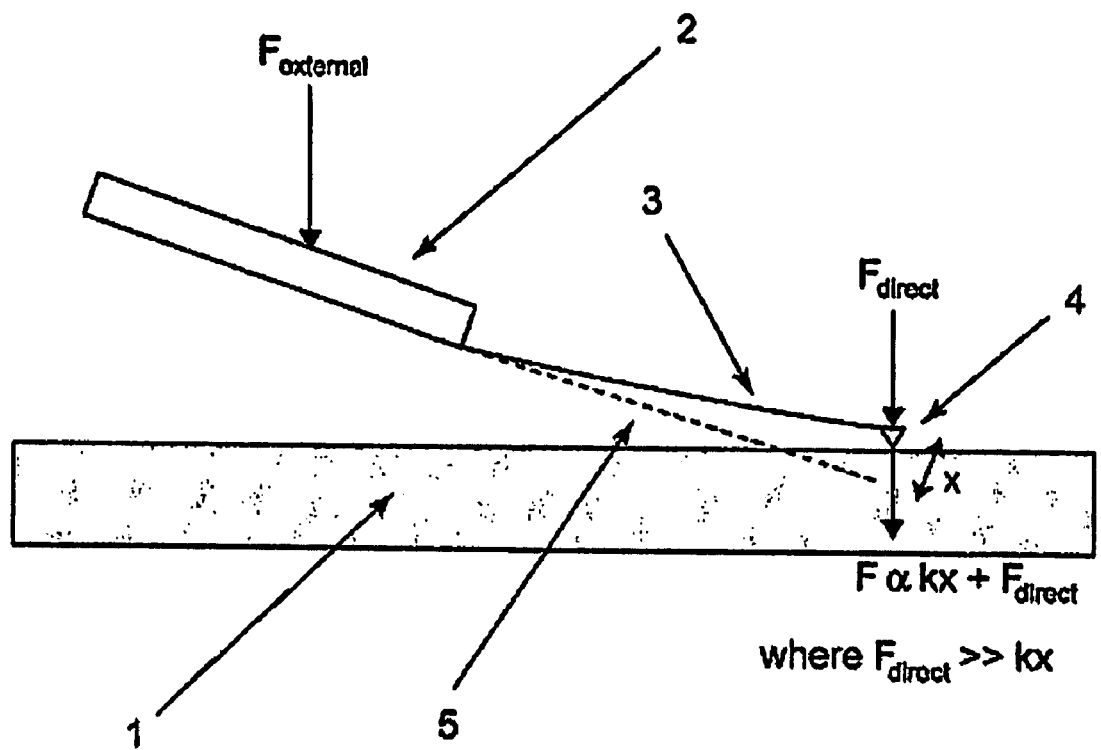
FIG. 8 is a diagrammatic illustration of the forces involved as a probe makes contact with a sample surface in the AFM of FIGS. 2 to 7.

In order to appreciate the features that are necessary to this invention it is helpful to look at a diagrammatic representation of the forces involved while a scan is being performed. This is illustrated in FIG. 8, which shows the same set up as FIG. 1 and so like components are similarly referenced. With reference to FIG. 8, there is shown a sample 1 that is being scanned by a probe of an atomic force microscope (AFM) in accordance with the present invention. The probe comprises a substrate 2 from which a supporting beam 3 extends, the supporting beam 3 having a sharp probing tip 4 mounted at an end remote from the substrate 2. In preparation for a scan, a downwards force ($F_{external}$) is applied to the probe at its substrate end 2 via its mounting to the AFM, moving the probe tip 4 Into contact with the sample 1. In order to maintain contact for the duration of a scan, the force $F_{external}$ is greater than that required simply to bring the tip 4 into contact with the sample 1. As a result the supporting beam 3 is bent upwards from its rest position with $F_{direct}$ present, 5, as the sample is scanned. As before, a force proportional to kx is generated as a result of the supporting beam bending and directs the probe tip 4 downwards towards the sample surface.

In the event that a probe designed in accordance with the present invention is deflected from the sample surface, for example by encounter with a raised portion, two factors assist in restoring it back towards contact. This enables better tracking of the surface to be achieved, even at high scan speeds. First, as is seen most clearly in the embodiments shown in FIGS. 37, a second force $F_{direct}$ acting to accelerate the probe towards the sample, can be tuned so as to reduce to a minimum the time it takes to bring the probe back into contact with the surface. This force, which is largely independent of topography, acts to reduce the response time of the probe. Secondly, the probe is coated with an energy absorbing material (or immersed in liquid) which reduces the mechanical energy stored in the probe and so reduces the effect that previous impulses have on its motion, ensuring that it rapidly obtains a stable state in contact with the surface. The total restoring force holding the probe to the surface is now dependent on:

$$F_{direct} + kx,$$

Ideally, the additional force $F_{direct}$ is greater than the cantilever bending force kx. Its magnitude should moreover be sufficiently large to bring the probe into contact with the surface, should it lose contact, within approximately one pixel.

In the embodiment depicted in FIG. 3, the additional force $F_{direct}$ is a magnetic force, provided by applying a magnetic field to a probe tip that Incorporates a magnetic element such as a bead or a magnetic coating. Clearly therefore the positioning of the magnet within the AFM is not critical, it merely has to be arranged such that there is a downward force component pulling the probe tip 4 into the sample 1. In the subsequent embodiments the additional force $F_{direct}$ is an electrostatic force.

In the embodiment depicted in FIG. 2, the additional force $F_{direct}$ is still contributing to the tracking performance of the probe, but its origin is more subtle. As the probe and sample are brought into close proximity a capillary neck is generally believed to form, connecting the two. This capillary neck is thought to arise from fluid that will inevitably be present in the sample environment when it is imaged in air, which condenses about the probe—sample contact. In normal operation, it is found that the direct force $F_{direct}$ arising from the capillary neck is sufficiently large that it quickly forms the dominant restoring force on the low-Q probe i.e. $F_{direct} > kx$. This is particularly true for hydrophilic surfaces. By choosing a probe that has a hydrophilic surface, for instance silicon nitride, it is possible to ensure that a capillary neck is formed between the probe and the sample.

Regardless of the origin of the additional direct force $F_{direct}$, the low Q of the probe permits stored energy to be dissipated rapidly as the supporting beam is straightened and the probe's contact with the sample surface is restored by the action of the direct force $F_{direct}$. Tracking of the sample surface by the probe is therefore achieved by a kind of mechanical feedback loop, which is faster acting than the prior art tracking mechanisms with their dependency on the cantilever bending force kx.

In the microscope described herein, the end of the probe is responding at a frequency considerably higher than its first mode of oscillation. Therefore, there is no longer a simple relationship between the bending of the probe, and its vertical position, as the degree of bending will now depend on how long it has been at that vertical position. Therefore, images obtained using a method based on the reflection of a laser from the back of the probe onto a split photodiode will not correspond to the topography of the surface, but rather to a combination of the topography and the gradient. To obtain Images that do correspond to topography, the displacement of the probe can be monitored for example using an interferometric method. For Instance, a fibre interferometer may be used to monitor the position of the end of the probe relative to the fibre, or an interferometer based on a Wollaston prism may be used to monitor the position of the end of the probe relative to another point, or an interference microscope may be used to monitor the position of the end of the probe, in which case the optical intensity at a position in the field of view of the microscope that corresponds with the end of the probe will vary depending on its vertical position. Whichever method is used, an image can now be obtained that will correspond to the topography of the surface, with particular application for metrology.

In order to assist in achieving $F_{direct} > kx$, the probe should be further designed with a relatively low spring constant. Typically this should be less than 1 $Nm^{-1}$, which can be achieved by using a suitably shaped probe. In the present invention, the cantilever deflection is useful only to define the position in space at which the probe sits, i.e. the interaction force between probe and sample, and so to enable an image to be collected.

In one prototype probe design, the cantilever has a typical spring constant of between 0.01 and 0.06 $Nm^{-1}$. An acceptable range is dependent on the height of features to be imaged. For a feature 50 nm high, the prototype probe will exert a restoring force of between 0.5 nN and 3 nN. The direct force that is applied to the tip is estimated to be of the order of 1-100 nN, resulting from a combination of forces from the capillary neck and electrostatic force, such as that generated with the set up shown in FIGS. 4, 5 and 7. The size of the electrostatic force can be controlled to optimise the image. This is set so that for the fastest required response, and hence maximum tip velocity, the highest force possible is supplied to the tip, which does not damage or disrupt the surface under investigation.

The ability to exploit a direct restoring force $F_{direct}$ as opposed to relying on the cantilever force in sample tracking represents a significant improvement over the prior art. By providing a probe that has a reduced ability to store mechanical energy, the principal forces acting on the probe are the direct force $F_{direct}$, and the force due to the immediate bending of the probe by the surface, with the direct force $F_{direct}$ being the dominant force. This applies regardless of whether the direct force is a "natural" force, generated by means of the capillary neck, or an additional, external force, such as that applied via a magnetic bead. In either case, the restoring force has a magnitude that is substantially independent of the position of the probe. By way of contrast, the magnitude of the prior art restoring force kx depends on the displacement x of the cantilever from its rest position. Thus high restoring forces are generated at particularly high regions of the sample. It is very difficult to ensure consistently that samples are not damaged if the restoring force is permitted to vary in this manner. A restoring mechanism Implemented in accordance with this invention has a magnitude that is largely independent of sample height.

As illustrated, it is not essential that the applied force is a magnetic force, although it is preferred that it is a force whose magnitude does not depend on sample height. It is required that there is a net force towards the surface so that any force from oscillatory modes present in the probe does not cause the probe to leave the surface. The larger the direct force $F_{direct}$ therefore, the less strict is expected to be the requirement for energy absorption and dissipation by the coating. In this regard, although it is possible to implement this invention with a low-Q cantilever that relies only on the capillary neck for the source of $F_{direct}$, it is preferred that a deflection-independent external force is also applied. A probe that is subject to electrostatic or magnetic forces, as illustrated in the embodiments described herein, is more controllable and provides more options for forming the highest quality images.

Figure 9:
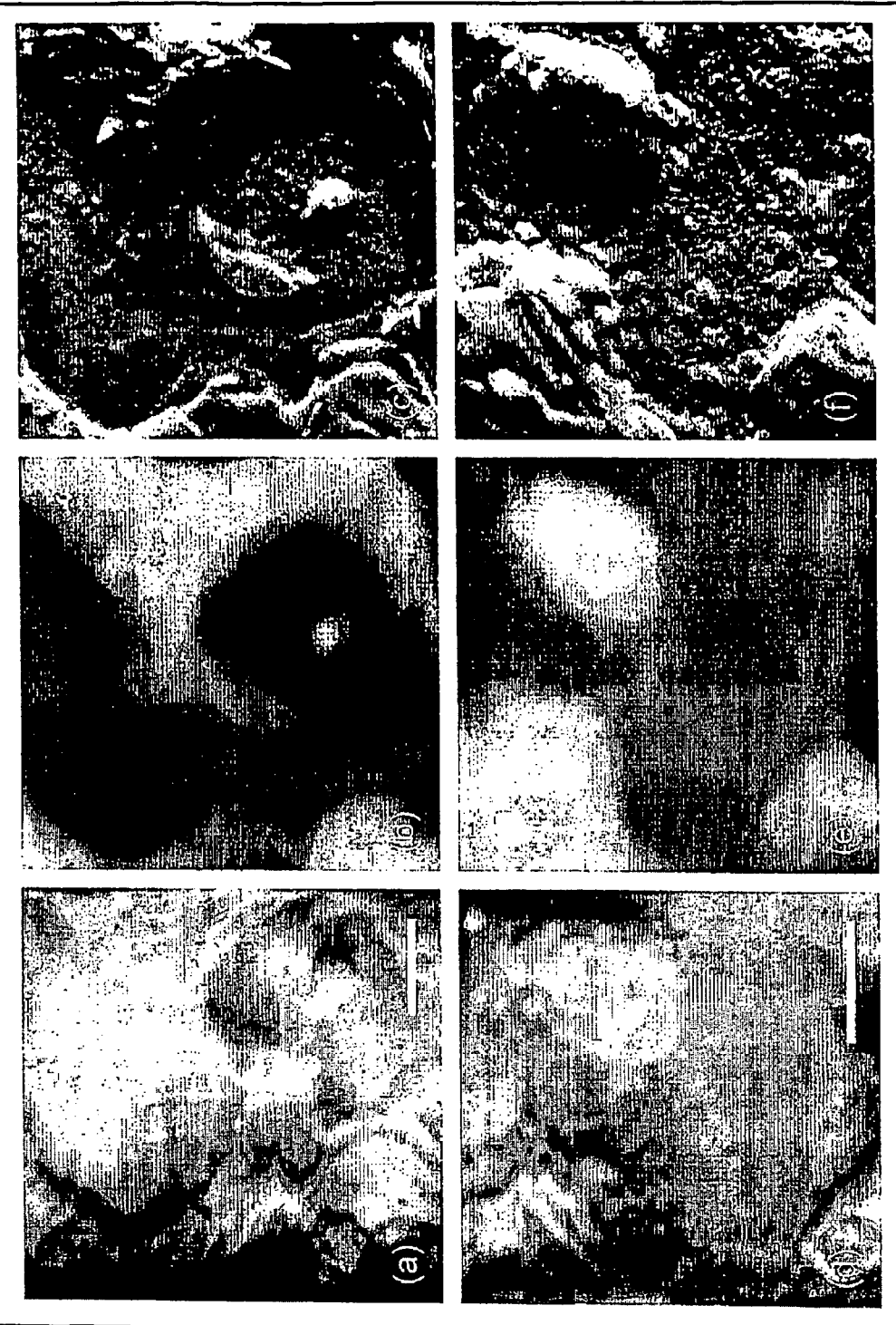
FIGS. 9a and 9d are AFM images of two separate surface regions of a sample of crystallised poly(ethylene-oxide) (PEO) produced using a probe In accordance with the present invention.
FIGS. 9b, 9c, 9e and 9f are conventional AFM images of the same surface regions as those of FIGS. 9a and 9d.

FIGS. 9a to 9f clearly illustrate the improvement in performance of the probe of the present invention over conventional AFM apparatus. FIGS. 9a, 9b and 9c are all images of the same surface region and FIGS. 9d, 9e and 9f are similarly all images of another surface region. In all cases the scale bar represents 1 micron and the material of the surface being imaged was crystallised poly(ethylene-oxide) (PEO) mounted on a glass substrate. FIGS. 9a and 9d are images produced using the probe of the present invention whereas FIGS. 9b and 9e are images produced using a conventional AFM monitoring changes in probe height and FIGS. 9c and 9f are images produced using a conventional AFM monitoring deflection changes. To produce the images of FIGS. 9a and 9d a Veeco Dimension 3100™ AFM with Nanoscope™ IV controller was used with commercially available cantilevers coated in a thin polymer film. The sample was mounted on a micro resonant scanner constructed from a quartz crystal resonator and 5 micron piezo stack (P-802 and E-505, Physik Instrument, Germany). To collect the data in FIGS. 9a and 9d the Resonant Scanning Controller of infinitesima Ltd was used. FIGS. 9a and 9d were constructed from a 128×128 pixel array over a period of only 14.3 ms, the probe tip velocity in the centre of each image being 22.4 cms$^{-1}$ and 16.8 cms$^{-1}$ respectively.

Thus with the present invention images of areas of a few microns can be produced in milliseconds unlike conventional AFM where image collection may take upwards of 30 seconds. Although the illustrated embodiments can be operated with scanning tip velocities equivalent to those currently employed with conventional AFM microscopy, the embodiments are capable of tip velocities upwards of 0.1 cms$^{-1}$ and depending upon the evenness of the sample surface tip speeds in excess of 50.0 cms$^{-1}$ can be achieved. For example, with a tip velocity of 22.4 cms$^{-1}$ an area of 4.4×4.4 microns can be imaged in 14.3 ms and an area of 1.5×1.5 microns in 8.3 ms. Moreover even at this speed, images with better than 10 nm lateral and 1 nm vertical resolution are achievable with a soft polymer surface.

It has further been observed that at these probe tip velocities the sample appears to be less susceptible to damage than at lower speeds. As the probe tip spends less time at each point, the sample is subject to less deformation and is therefore less likely to reach a point at which it starts to deform plastically. With the present invention the surface of the sample can be subjected to shear rates of around $10^8$ ms$^{-1}$, which is a rate at which many polymers, for example, exhibit glass characteristics. In general, it has been found that higher frequencies can push a visco-elastic liquid down through the glass transition temperature and therefore change the properties of the surface that the probe 'sees' resulting in less damage to the sample.

The probe of the present invention is selected to have a low Q, ideally such that any induced oscillation is critically damped. As described herein, the most preferred arrangement, and one which is sufficiently effective to enable improved tracking by means of the natural restoring force due to the capillary neck, is to coat one or both sides of the supporting beam of the probe with an energy absorbing material, such as a polymer film. An alternative, particularly if a large magnetic (or other additional) force is applied, means to ensure low Q is by judicious selection of probe shape. Another alternative is simply to provide a low 0 factor by immersing the probe in a viscous/liquid environment during the scan. A further alternative is to alter electronically the properties of the supporting beam of the probe, for example where the supporting beam is formed from or Includes electro-responsive materials which can be addressed to provide a lower effective Q factor.

The supporting beam, probe tip and any additional component such as the magnetic bead are ideally of low mass. This naturally increases the acceleration of the tip back to the surface for a given restoring force and so better enables the probe to track the surface.

The supporting beam may be of bespoke design so as to promote the ideal response. That is, to minimise the direction-dependent restoring force as a result of bending as the probe tracks the sample and to damp the oscillation response should the probe leave the surface (low Q factor). Although often referred to as a cantilever design herein, this is simply because use is being made of adapting prior art AFMs to this new purpose. Prior art AFMs make use of a cantilever probe. All that is required for the present invention is that the probe tip must have a definable lateral position (x, y plane) relative to the sample and free movement in the z direction. A prior art AFM cantilever probe can readily perform this function, but it does not represent the only solution.

Figure 10:
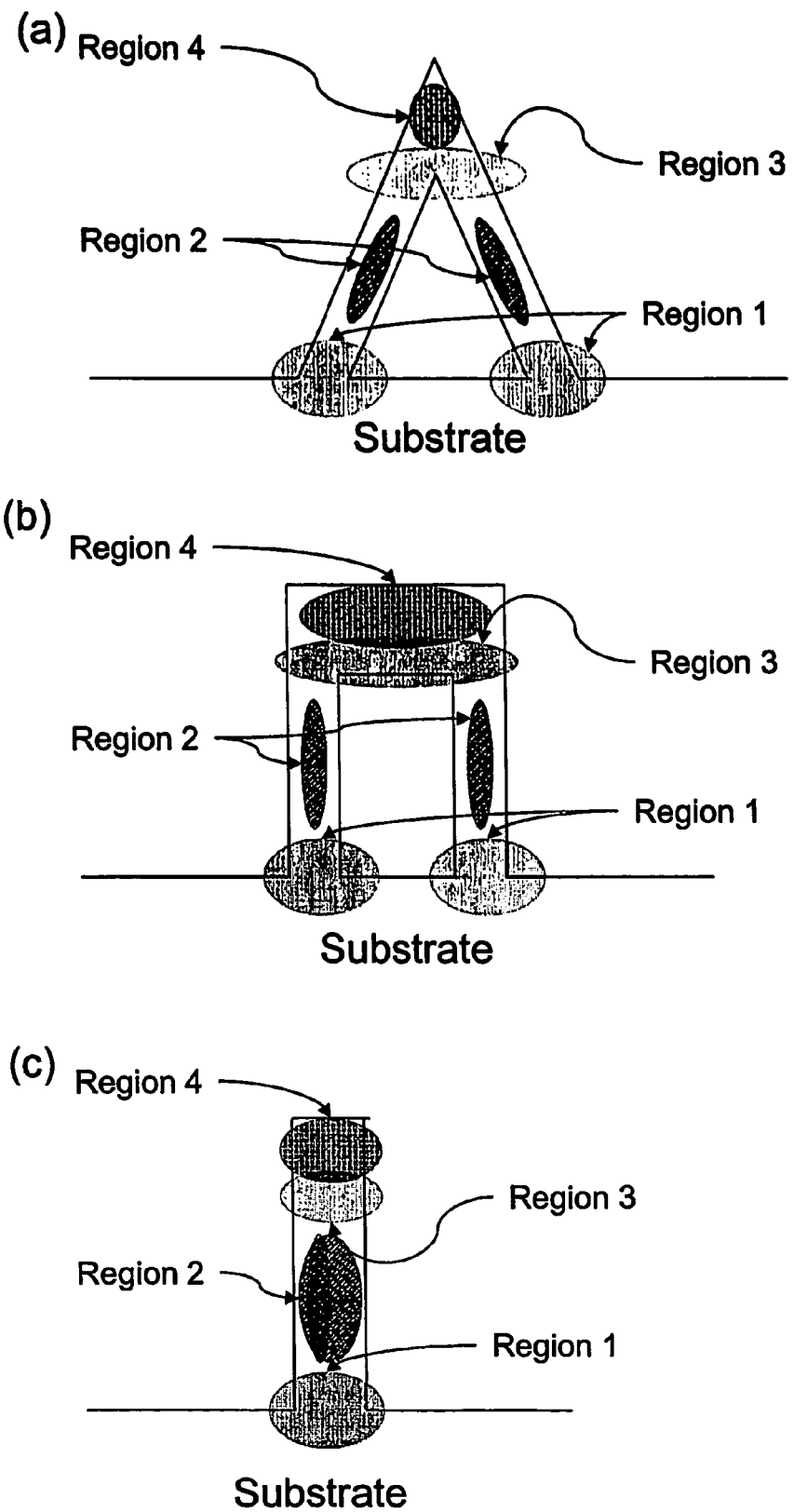
FIG. 10 illustrates examples of bespoke cantilever design for a probe of the present invention.

Returning to the embodiment that includes a supporting beam for the probe tip, FIG. 10 illustrates various possible design features of more sophisticated beams, viewed from above, that contribute to reducing the restoring force and lowering the Q factor. A polymer coating, as described herein, may be used in conjunction with each design to tailor the response further. FIG. 10(c) shows the more traditional beam shape, but FIGS. 10(a) and (b) depict alternative possibilities. In each design, Regions 1 to 4 are highlighted, each region being designed with particular properties. Each diagram (a) to (c) illustrates one or more supporting beams extending forward of the substrate.

Region 1 in all cases is the pivot point. That is, the region about which the cantilever beam swings in an arc. Region 1 therefore has a very low spring constant along the z axis (Ideally <0.01 Nm$^{-1}$) and a very high spring constant in the x, y plane. The lateral position of the tip is thus defined relative to the substrate position but it is also permitted to move freely perpendicular to the sample surface, for small deflections.

Region 2 forms the basic beam structure. It should be stiff with high fundamental resonant frequencies.

Region 3 is the bending region, which permits the tip to move up and down, connecting the beams to the tip region. The spring constant of this region is selected so that the resonant frequency of the tip is higher than the response time of the probe, i.e. greater than the bandwidth of the mechanical feedback loop. This region should also be polymer coated in order to provide damping in air. If imaging in liquid however the need for a coating is largely overcome by the energy-dissipating properties of the liquid environment.

Region 4 is the tip region. The probe tip is attached to or forms part of its lower surface. The region's area must be large enough for its position to be determined by the position detection system, which, for the optical lever and other far field optical systems, essentially amounts to a lateral dimension greater than a few microns.

In the embodiments in which an external direct force is applied to the probe In order to urge it towards the surface, the element responsive to this force may be located on the tip region 4, the beam region 2, or both. It is preferable however that it is located at the tip.

Figure 11:
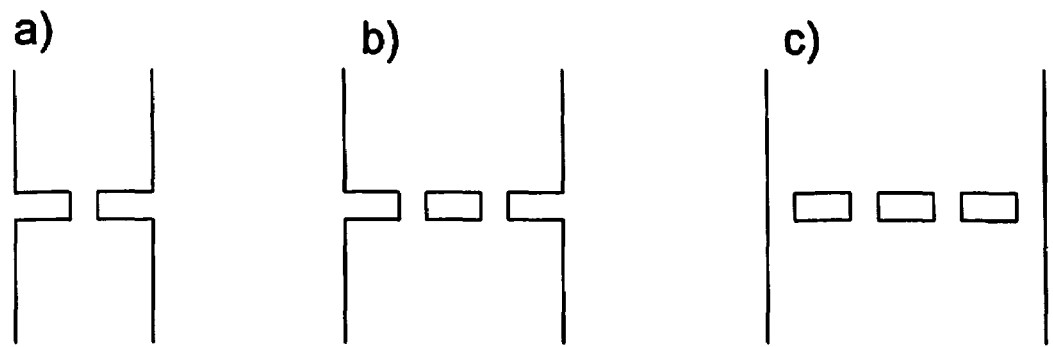
FIGS. 11 and 12 illustrate formation of regions of low and controlled spring constant in a bespoke cantilever.
Figure 12:
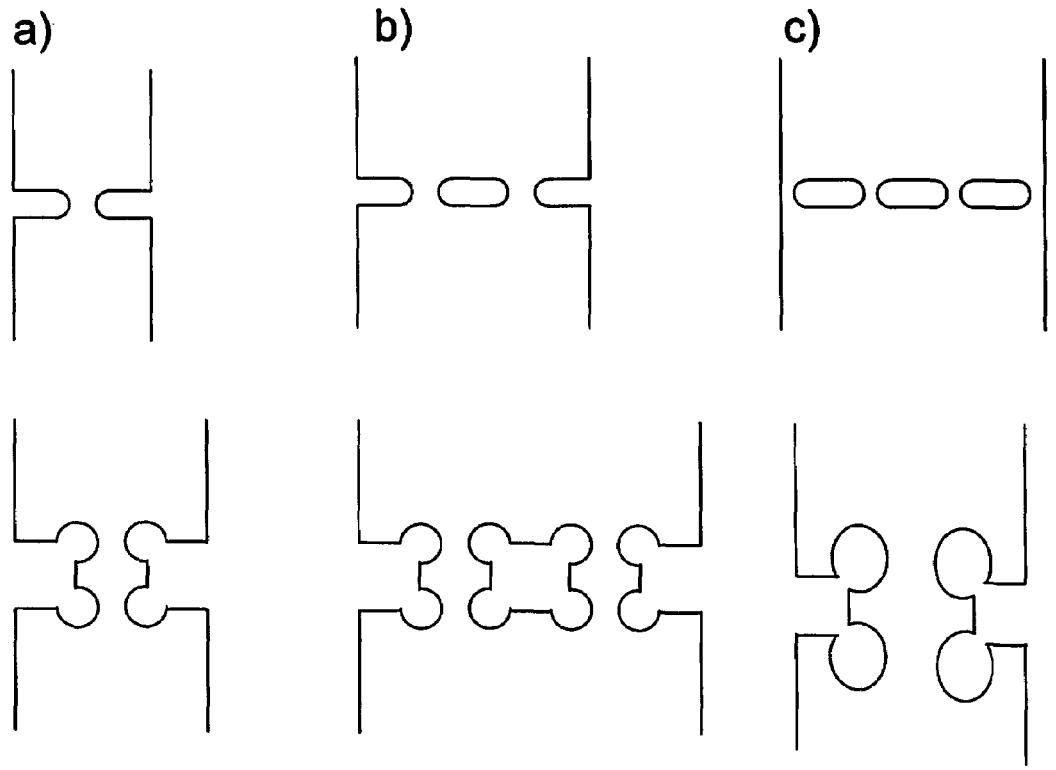

FIGS. 11 and 12 illustrate examples of the formation of low and controlled spring constant in a beam. Essentially, as shown in FIG. 11, this involves forming holes at the required location in the supporting beam. The designs shown in FIGS. 11(b) and (c) provide increased lateral stability in comparison with that of FIG. 11(a). Hole shapes may be varied, for example as shown in FIG. 12, in order to control properties of a polymer coating. That is, curved, square or other shaped holes affect differently the way the polymer coating is formed on the beam surface, which in turn affects the damping properties of the cantilever.

The advantage of providing a bespoke design of probe supporting beam is that it enables separation of the distinct requirements for oscillation damping and reduction of the deflection-dependent restoring force. In particular, it can be designed such that only a dominant mode is excited as a high region of a sample surface is encountered. It is therefore only necessary to ensure that the beam, for example by its coating, has a low Q factor with respect to this mode, as opposed to the multi mode requirement of the prior art cantilever beam.

It is to be noted that the apparatus shown in FIGS. 2 through 7 are merely Illustrative of exemplary AFMs. There are numerous different embodiments of AFM with which this invention may be implemented all of which omit conventional feedback control of probe height as the principle method for obtaining an image. For example, mounting on a resonator such as a tuning fork is not necessary. This arrangement is simply used in these embodiments in order to illustrate the applicability of this invention to fast scanning techniques that make use of a resonant oscillation. It is equally applicable to slower scanning methods. The probe 22 may alternatively be oscillated in place of the sample 14. With this alternative embodiment K is envisaged that where optical techniques are employed to monitor the displacement of the probe, the imaging beam is broad enough to encompass the fast scan axis.

Probe deflection/displacement may be measured by means other than the optical lever technique. Alternative techniques known in the art include interferometry and piezoelectrically coated probes as well as detection of thermal variations in the radiant output of a heated probe. By employing Interferometry for monitoring the deflection/displacement of the probe it is possible to extract purely topographic data of the sample surface from probe deflection data which, because of the frequencies at which the probe is responding, is representative of both the topology of the sample surface and frequency of spatial features. Also, although the use of piezoelectric actuators for control of the movement of the sample plate/probe are preferred, other actuators involving for example thermal expansion of a control rod, are envisaged.

Although control of the Q factor of the probe has been described in terms of providing an energy absorbing coating to the supporting beam of the probe, other means for controlling the Q factor of the probe are envisaged including electronic control.

In order to image surface areas larger than the scan area of the probe, separate sequential images of different, usually adjacent, regions can be generated and then combined to construct an image over that larger area. Stepper motors or other actuators may be used to move the probe and/or sample plate between the separate images before the fine positional adjustment for each individual image. Ideally the individual scan areas are selected to overlap so that visual confirmation of alignment of the individual images is possible.

If a tuning fork 16 is used then it may be one of a number of commercially available forks, or of bespoke design to provide a desired frequency of oscillation. A suitable example is a quartz crystal fork with resonant frequency of 32 kHz. A tuning fork is well suited to this application as it is designed with highly anisotropic mechanical properties. Its resonances are therefore independent and can be individually excited and so limited to only that (or those) in the plane of the sample. Importantly, the fork 16 can be resonated in one direction and scanned in another, without coupling occurring between modes. It therefore permits stable fast motion of the sample 14 as it is interrogated by the probe 22. Alternative mechanical resonators that have a similar facility for well-separated lateral and vertical resonances can be used in place of the tuning fork.

The invention is not limited to pure AFM operation, although it is required that there is a force interaction between the probe and the sample surface. This mode of operation can however be combined with microscope components designed to monitor other interactions or interaction indicators between probe and sample. Examples of other interactions may include optical, capacitative, magnetic, shear force or thermal interactions. Other Indicators include oscillation amplitude, either tapping or shear force, capacitance or induced electric currents. These various modes of operation of general probe microscopes are described, for example, in UK patent application number 0310344.7.

The interaction of the probe with the sample surface that is exploited in AFM also makes it possible to affect the properties of the surface and so deliberately to "write" information to the sample. This technique is known as nanolithography, and AFMs are widely used for this purpose. For example, by application of a voltage to a conductive cantilever a region of a metallic layer of a sample wafer can be oxidised. Another example exploiting two-photon absorption and polymerisation of a photoresist is described in "Near-field two-photon nanolithography using an apertureless optical probe" by Xiaobo Yin et al. in Appl. Phys. Lett. 81(19) 3663 (2002). In both examples the very small size of the probe enables information to be written to an extremely high density. The AFM and cantilever probe of this invention can also be adapted for use in nanolithography. The ability to Improve surface tracking with this invention not only offers the potential for faster writing times than previously achieved, but also offers the potential for increased image resolution i.e. write density. To render it more adapted for use in nanolithography the probe tip may be electrically conductive, it may be metal coated in order to increase its optical interaction with the surface or it may be coated with selected molecular species for use in dip pen lithography applications.

The invention claimed is:

1. A probe for use in an atomic force microscope, the probe comprising a tip and a beam, the tip having a tip radius of 100 nm or less, the beam connected to the tip and having a first and second side and coated on at least one of the first and second sides with a mechanical-energy dissipating polymer, wherein the polymer includes one or more substance selected from the group consisting of i) rubber with low cross-linking density, and ii) a block copolmer material with a majority component that is an amorphous rubber with a glass transition temperature below room temperature and a minority component that is an amorphous polymer with a glass transition temperature above room temperature.

2. The probe as claimed in claim 1, wherein the probe further includes a biasing element such that a biasing force applied to the biasing element urges a restoring force arising from bending of the beam caused by a displacement of the tip as it probes a sample and wherein the biasing force is a substantially deflection-independent externally applied force.

3. The probe as claimed in claim 2, wherein the biasing element comprises a magnetic element responsive to an externally applied magnetic force.

4. The probe as claimed in claim 3, wherein the magnetic element is mounted on the force sensing member adjacent the tip.

5. The probe as claimed in claim 2, wherein the biasing element comprises an electrically conductive member adapted for connection to one terminal of a power supply for applying a voltage potential between the probe and the sample.

6. The probe as claimed in claim 5, wherein the biasing element is provided adjacent the probe tip.

7. The probe according to claim 1, wherein the polymer is applied to the beam by solution casting.

8. The probe according to claim 1, wherein a damping element is provided by a region of the beam having a spring constant less than 1 $Nm^{-1}$.

9. An atomic force microscope for imaging a sample in accordance with an interaction force between the sample and a probe, the microscope comprising:
  a driver arranged to provide relative scanning motion between the probe and the sample surface and capable of bringing the sample and probe into close proximity, sufficient for a detectable interaction to be established between them; and
  a probe detection mechanism arranged to measure deflection and/or displacement of the probe;
  wherein the microscope includes the probe of claim 1.

10. The atomic force microscope as claimed in claim 9, further comprising a resonant oscillator mechanically coupled to either the probe or a sample stage for causing relative oscillatory movement between the probe and the sample the relative oscillatory movement having an amplitude least one micrometer.

11. An atomic force microscope comprising a driver; a probe having a tip, a substrate and a beam connecting the tip and the substrate; and a probe detection mechanism;
  at least a portion of the beam coated with a polymer and the polymer includes a rubber having a low cross-linking density;
  the driver operably connected to the substrate and arranged to provide relative scanning motion between the probe and a sample surface and capable of bringing the sample and probe into close proximity, sufficient for a detectable interaction to be established between them; and
  the probe detection mechanism arranged to measure at least one of deflection or displacement of the probe;
  wherein the microscope includes a force generator arranged such that, in operation, a force is applied to either or both of the sample and the probe or between the sample and the probe, the force being directed so as to urge the probe towards the sample or vice versa.

12. The microscope according to claim 11, wherein the force has a magnitude that is substantially independent of the degree of deflection of the probe.

13. The microscope according to claim 12, wherein the force is greater than a restoring force provided by a deflection of the probe as it scans the surface of the sample.

14. The microscope according to claim 13, wherein the probe has spring constant that is less than 1 $Nm^{-1}$.

15. The microscope according to claim 11, wherein the force generator comprises a magnet and a magnetic element incorporated in the probe.

16. The microscope according to claim 11, wherein the force generator comprises a circuit that applies an attractive biasing voltage between the probe tip and the sample.

17. The microscope according to claim 11, wherein the force generator comprises a sample environment which encourages the formation of a capillary neck between the probe and the sample, the capillary neck providing said applied force.

18. The microscope according to claim 17, wherein the force generator further comprises a hydrophilic surface on said probe.

19. The microscope according to claim 11, further comprising means for immersing the probe and sample in a liquid during operation of the microscope.

20. The atomic force microscope as claimed in claim 11, further comprising a resonant oscillator mechanically coupled to either the probe or a sample stage for causing relative oscillatory movement between the probe and the sample with an oscillatory amplitude of at least one micrometer.

21. A method of collecting image data from a scan area of a sample with nanometric features wherein the method comprises the steps of:
  (a) moving a probe having a beam and a tip having a tip radius of 100 nm or less into close proximity with a sample in order to allow an interaction force to be established between probe and sample; the beam having a first and second side and is coated on at least one of the first and second sides with a polymer, the polymer including one or more substance selected from the group consisting of i) rubber with low cross-linking density, and ii) a block copolymer material with a majority component that is an amorphous rubber with a glass transition temperature below room temperature and a minority component that is an amorphous polymer with a glass transition temperature above room temperature;
  (b) causing a substantially deflection-independent force to be established between the sample and the tip such that the probe is urged to move towards the sample or vice versa;
  (c) scanning either the probe across the surface of the sample or the sample beneath the probe whilst providing a relative motion between the probe and sample surface such that an arrangement of scan lines covers a scan area;
  (d) measuring at least one of deflection or displacement of the probe; and
  (e) processing measurements taken at step (d) in order to extract information relating to the nanometric structure of the sample.

22. The method as claimed in claim 21, wherein the relative motion between the probe and the sample surface under step (c) is provided by a resonant oscillator.

23. An atomic force microscope comprising:
a probe having a substrate, a tip, and a beam connecting the substrate and the tip; the beam having a spring constant less than 1 Nm$^{-1}$, a top, and a bottom; the beam coated on at least one of the top or the bottom with a polymer and the polymer is one or more substance selected from the group consisting of i) rubber with low cross-linking density, and ii) a block copolymer material with a majority component that is an amorphous rubber with a glass transition temperature below room temperature and a minority component that is an amorphous polymer with a glass transition temperature above room temperature;
the atomic force microscope further comprising
a sample plate;
a driver operably connected to the substrate and the sample plate, the driver capable of bringing a sample on the sample plate and the tip into close proximity, the beam bent upwards from its rest position when the sample and the tip are in close proximity and exerting a bending force that is proportional to the spring constant of the beam and the degree of beam bending;
a force generator that applies a direct force to probe, the direct force exerted toward the sample and greater than the bending force; and
a probe detection mechanism operably connected to the probe and that measures at least one of deflection or displacement of the probe;
wherein a total restoring force that urges the sample and the probe tip together is proportional to the sum of the bending force and the direct force.

24. The atomic force microscope of claim 23, wherein the spring constant is 0.01 to 0.06 Nm$^{-1}$.

25. The atomic force microscope of claim 23, wherein the direct force is 1 to 100 nN.

26. The atomic force microscope of claim 23, wherein the direct force is substantially independent of the topography of the sample.

27. The atomic force microscope of claim 23, wherein the first side of the beam is distal to the sample and is coated with the polymer.

28. An atomic force microscope comprising:
a probe having a substrate, a tip, and a beam connecting the substrate and the tip;
the beam having a polymer coated on at least a portion of the beam; the polymer being a rubber with low cross-linking density; the beam having a spring constant less than 1 Nm$^{-1}$;
a sample plate;
a driver operably connected to the substrate and the sample plate, the driver capable of bringing a sample on the sample elate and the tip into close proximity, the beam bent upwards from its rest position when the sample and the tip are in close proximity and exerting a beam restoring force that is proportional to the spring constant of the beam and the degree of beam bending;
a probe detection mechanism operably connected to the probe and that measures at least one of deflection or displacement of the probe.

29. The atomic force microscope of claim 28, wherein the spring constant is 0.01 to 0.06 Nm$^{-1}$.

30. The atomic force microscope of claim 28, wherein the at least a portion of the beam is a side of the beam distal to the sample.

31. The atomic force microscope of claim 28, further comprising a force generator that applies a direct force to the probe, the direct force independent of the topography of the sample and exerted toward the sample; wherein a total restoring force that urges the sample and the probe tip together is proportional to the sum of the beam restoring force and the direct force.

32. The atomic force microscope of claim 28, wherein the direct force is 1 to 100 nN.

33. An atomic force microscope comprising:
a probe having a substrate, a tip, and a beam connecting the substrate and the tip;
the beam having a polymer coated on at least a portion of the beam; the polymer being a block copolymer material having a majority component that is an amorphous rubber with a glass transition temperature below room temperature and a minority component that is an amorphous polymer with a glass transition temperature above room temperature; the beam having a spring constant less than 1 Nm$^{-1}$;
a sample plate;
a driver operably connected to the substrate and the sample plate, the driver capable of bringing a sample on the sample plate and the tip into close proximity, the beam bent upwards from its rest position when the sample and the tip are in close proximity and exerting a beam restoring force that is proportional to the spring constant of the beam and the degree of beam bending:
a probe detection mechanism operably connected to the probe and that measures at least one of deflection or displacement of the probe.

34. The atomic force microscope of claim 33, wherein the spring constant is 0.01 to 0.06 Nm$^{-1}$.

35. The atomic force microscope of claim 33, wherein the at least a portion of the beam is a side of the beam distal to the sample.

36. The atomic force microscope of claim 33 further comprising a force generator that applies a direct force to the probe, the direct force independent of the topography of the sample and exerted toward the sample; wherein a total restoring force that urges the sample and the probe tip together is proportional to the sum of the beam restoring force and the direct force.

37. The atomic force microscope of claim 33, wherein the direct force is 1 to 100 nN.

* * * * *